(12) United States Patent
Takata

(10) Patent No.: US 11,132,782 B2
(45) Date of Patent: Sep. 28, 2021

(54) ARTICLE INSPECTION APPARATUS, ARTICLE INSPECTION SYSTEM, AND NON-TRANSITORY COMPUTER-READABLE STORAGE MEDIUM STORING COMPUTER PROGRAM

(71) Applicant: ANRITSU INFIVIS CO., LTD., Kanagawa (JP)

(72) Inventor: Osamu Takata, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 233 days.

(21) Appl. No.: 16/397,205

(22) Filed: Apr. 29, 2019

(65) Prior Publication Data

US 2019/0376912 A1    Dec. 12, 2019

(30) Foreign Application Priority Data

Jun. 8, 2018    (JP) .............................. JP2018-110595

(51) Int. Cl.
*G06T 7/00* (2017.01)
*G01N 23/18* (2018.01)
*G01N 23/083* (2018.01)

(52) U.S. Cl.
CPC .......... *G06T 7/0004* (2013.01); *G01N 23/083* (2013.01); *G01N 23/18* (2013.01); *G06T 2207/30128* (2013.01)

(58) Field of Classification Search
CPC .... G01N 23/083; G01N 23/18; G06T 7/0002; G06T 7/0004; G06T 2207/30128
See application file for complete search history.

(56) References Cited

U.S. PATENT DOCUMENTS

2010/0322373 A1*  12/2010  Churilla ............... G01N 23/046
378/4

FOREIGN PATENT DOCUMENTS

| JP | 2009183818 A | * | 8/2009 |
| JP | 2011-191180 A | | 9/2011 |
| JP | 2012-022904 A | | 2/2012 |
| JP | 2013-113612 A | | 6/2013 |

(Continued)

OTHER PUBLICATIONS

Machine Translation of JP 2013-113612 A (Year: 2013).*

*Primary Examiner* — Chih-Cheng Kao
(74) *Attorney, Agent, or Firm* — Pearne & Gordon LLP

(57) ABSTRACT

Included are an inspection unit that outputs a detection signal corresponding to type and size of a foreign matter contained in an inspection object or a detection signal corresponding to weight of the inspection object, a determination unit that performs a pass/fail determination as to the inspection object, based on the detection signal from the inspection unit, an inspection record information accumulation unit that accumulates inspection record information including inspection date and time and inspection data, and a control unit that displays on a display operation unit, a list of inspection data of an inspection object having a defective inspection result from the inspection record information, and if one inspection object is selected from the inspection objects displayed as the list by an operation on the display operation unit, displays on the display operation unit, the inspection data in a predetermined range with reference to the selected inspection object.

11 Claims, 6 Drawing Sheets

(56) References Cited

FOREIGN PATENT DOCUMENTS

| JP | 2014-059201 A | 4/2014 |
| JP | 2016-080506 A | 5/2016 |

* cited by examiner

FIG. 2

X-RAY INSPECTION SYSTEM
INSPECTION RESULT

| NO | PRODUCT NAME | LINE NAME | INSPECTION DATE | RESULT |
|---|---|---|---|---|
| 1 | Chocolate | TEST3 | 2018-03-05 10:15:12 | Contam.NG |
| 2 | Chocolate | TEST3 | 2018-03-05 10:15:12 | Contam.NG |
| 3 | Chocolate | TEST3 | 2018-03-05 10:15:03 | Contam.NG |
| 4 | Chocolate | TEST3 | 2018-03-05 10:15:01 | Contam.NG |
| 5 | Chocolate | TEST3 | 2018-03-05 10:14:52 | Contam.NG |
| 6 | Chocolate | TEST3 | 2018-03-05 10:14:52 | Contam.NG |
| 7 | Chocolate | TEST3 | 2018-03-05 10:14:49 | Contam.NG |
| 8 | Chocolate | TEST3 | 2018-03-05 10:14:48 | Contam.NG |
| 9 | Chocolate | TEST3 | 2018-03-05 10:14:41 | Contam.NG |
| 10 | Chocolate | TEST3 | 2018-03-05 10:14:40 | Contam.NG |
| 11 | Chocolate | TEST3 | 2018-03-05 10:14:36 | Contam.NG |
| 12 | Chocolate | TEST3 | 2018-03-05 10:14:30 | Contam.NG |
| 13 | Chocolate | TEST3 | 2018-03-05 10:14:26 | Contam.NG |
| 14 | Chocolate | TEST3 | 2018-03-05 10:14:26 | Contam.NG |
| 15 | Chocolate | TEST3 | 2018-03-05 10:14:24 | Contam.NG |
| 16 | Chocolate | TEST3 | 2018-03-05 10:14:18 | Contam.NG |
| 17 | Chocolate | TEST3 | 2018-03-05 10:14:13 | Contam.NG |

DISPLAY DATA BEFORE & AFTER

RETURN

| X-RAY INSPECTION SYSTEM INSPECTION RESULT | | | | |
|---|---|---|---|---|
| NO | PRODUCT NAME | LINE NAME | INSPECTION DATE | RESULT |
| 104 | Chocolate | TEST3 | 2018-03-05 10:14:29 | OK |
| 105 | Chocolate | TEST3 | 2018-03-05 10:14:29 | OK |
| 106 | Chocolate | TEST3 | 2018-03-05 10:14:30 | Contam.NG |
| 107 | Chocolate | TEST3 | 2018-03-05 10:14:30 | OK |
| 108 | Chocolate | TEST3 | 2018-03-05 10:14:31 | OK |
| 109 | Chocolate | TEST3 | 2018-03-05 10:14:32 | OK |
| 110 | Chocolate | TEST3 | 2018-03-05 10:14:32 | OK |
| 111 | Chocolate | TEST3 | 2018-03-05 10:14:33 | OK |
| 112 | Chocolate | TEST3 | 2018-03-05 10:14:33 | OK |
| 113 | Chocolate | TEST3 | 2018-03-05 10:14:34 | OK |
| 114 | Chocolate | TEST3 | 2018-03-05 10:14:34 | OK |
| 115 | Chocolate | TEST3 | 2018-03-05 10:14:35 | OK |
| 116 | Chocolate | TEST3 | 2018-03-05 10:14:35 | OK |
| 117 | Chocolate | TEST3 | 2018-03-05 10:14:36 | OK |
| 118 | Chocolate | TEST3 | 2018-03-05 10:14:36 | Contam.NG |
| 119 | Chocolate | TEST3 | 2018-03-05 10:14:37 | OK |
| 120 | Chocolate | TEST3 | 2018-03-05 10:14:37 | OK |
| 121 | Chocolate | TEST3 | 2018-03-05 10:14:38 | OK |
| 122 | Chocolate | TEST3 | 2018-03-05 10:14:38 | OK |
| 123 | Chocolate | TEST3 | 2018-03-05 10:14:39 | OK |
| 124 | Chocolate | TEST3 | 2018-03-05 10:14:39 | OK |
| 125 | Chocolate | TEST3 | 2018-03-05 10:14:40 | OK |
| 126 | Chocolate | TEST3 | 2018-03-05 10:14:40 | Contam.NG |
| 127 | Chocolate | TEST3 | 2018-03-05 10:14:41 | Contam.NG |
| 128 | Chocolate | TEST3 | 2018-03-05 10:14:41 | OK |
| 129 | Chocolate | TEST3 | 2018-03-05 10:14:42 | OK |
| 130 | Chocolate | TEST3 | 2018-03-05 10:14:42 | OK |

FIG. 3

ARTICLE INSPECTION APPARATUS, ARTICLE INSPECTION SYSTEM, AND NON-TRANSITORY COMPUTER-READABLE STORAGE MEDIUM STORING COMPUTER PROGRAM

TECHNICAL FIELD

The present invention relates to an article inspection apparatus for inspecting the quality of an inspection object such as meat, fish, processed food, medicine, and the like.

BACKGROUND ART

In the relate art, as article inspection apparatuses for inspecting the quality of an inspection object, a weight measurement apparatus, an X-ray inspection apparatus, a metal detection apparatus, and the like have been known. The weight measurement apparatus in the related art measures the mass of the conveyed inspection object, determines whether or not the obtained measurement value is within the specified range, and sorts out non-defective items within the specified range and other defective items. Further, the X-ray inspection apparatus in the related art applies X rays to the conveyed inspection object, and detects whether or not foreign matters are mixed in the inspection object from the amount of transmission of the irradiated X-ray. Further, the metal detection apparatus in the related art generates an alternating magnetic field in the conveyance line, causes the inspection object to pass through the alternating magnetic field, and detects whether or not metal is mixed, from the detection output when the inspection object passes through the magnetic field.

Patent Document 1 describes an article inspection apparatus which accumulates inspection result data such as a pass/fail determination result, and a detection signal and time at a time of inspection, for each inspection object, selects a predetermined extraction condition from a plurality of stored extraction conditions, and extracts and displays inspection result data satisfying the selected extraction condition.

RELATED ART DOCUMENT

Patent Document

[Patent Document 1] JP-A-2013-113612

DISCLOSURE OF THE INVENTION

Problem that the Invention is to Solve

In the case described in Patent Document 1, it is possible to perform search by designating conditions about only defective items, and narrow down the results and refer to the results.

However, when a blade or the like is missing and mixed in a product, large fragments are detected to make the result NG, but a small fragments are not detected and lead to contamination of foreign matter.

In order to find a product containing small fragments, it is necessary to re-set the search condition by the magnitude of the influence value, and to perform the search again several times.

Therefore, an object of the present invention is to provide an article inspection apparatus capable of displaying inspection data of a product which is considered to require confirmation without resetting a search condition or the like.

Means for Solving the Problem

An article inspection apparatus of the present invention is an article inspection apparatus which includes an inspection record information accumulation unit that accumulates inspection record information including inspection date and time and inspection data of a conveyed inspection object which is inspected, and displays the inspection record information on a display unit, the article inspection apparatus includes a control unit that displays on the display unit, the inspection data in a predetermined range with reference to the inspection object having a defective inspection result from the inspection record information.

With this configuration, inspection data in a predetermined range with reference to the inspection object having a defective inspection result is displayed. Therefore, it is possible to display inspection data of a product which is considered to require confirmation without resetting a search condition or the like.

In the article inspection apparatus of the present invention, the control unit displays on the display unit, a list of the inspection data of the inspection objects having the defective inspection result from the inspection record information, and displays on the display unit, the inspection data in a predetermined range with reference to the inspection object having the defective inspection result, selected from the inspection objects displayed as the list by an operation on an operation unit.

With this configuration, a list of the inspection data of the inspection objects having a defective inspection result is displayed, and the inspection data in a predetermined range with reference to the inspection object having a defective inspection result, selected from the inspection objects displayed as the list, is displayed. Therefore, it is possible to display inspection data of a product which is considered to require confirmation without resetting a search condition or the like.

Further, in the article inspection apparatus of the present invention, the control unit displays on the display unit, the inspection data in a predetermined range with reference to a latest inspection object having the defective inspection result.

With this configuration, inspection data in a predetermined range with reference to the latest inspection object having a defective inspection result is displayed. Therefore, it is possible to display inspection data of a product which is considered to require confirmation without resetting a search condition or the like.

In the article inspection apparatus of the present invention, the control unit displays an image of information obtained by inspection as the inspection data.

With this configuration, an image of the information obtained by the inspection is displayed as inspection data. Therefore, the result of the inspection can be visually checked, and the work efficiency of checking the inspection data can be improved.

An article inspection system according to the present invention is an article inspection system which manages inspection record information including inspection date and time and inspection data of an article inspection apparatus for inspecting a conveyed inspection object, and includes a server apparatus that displays the inspection data in a predetermined range with reference to the inspection object having a defective inspection result from the inspection record information.

With this configuration, inspection data in a predetermined range with reference to the inspection object having a defective inspection result is displayed. Therefore, it is possible to display inspection data of a product which is considered to require confirmation without resetting a search condition or the like.

Further, in the article inspection system according to the present invention, the server device displays a list of the inspection data of the inspection objects having the defective inspection result from the inspection record information, and displays the inspection data in a predetermined range with reference to the inspection object having the defective inspection result, selected from the inspection objects displayed as the list.

With this configuration, a list of the inspection data of the inspection objects having a defective inspection result is displayed, and the inspection data in a predetermined range with reference to the inspection object having a defective inspection result, selected from the inspection objects displayed as the list, is displayed. Therefore, it is possible to display inspection data of a product which is considered to require confirmation without resetting a search condition or the like.

Further, a program for an article inspection system of the present invention is a program for an article inspection system which manages inspection record information including inspection date and time and inspection data of an article inspection apparatus for inspecting a conveyed inspection object, the program causing a computer to execute a step of displaying a list of the inspection data of the inspection objects having a defective inspection result from the inspection record information, and a step of, if one of the inspection objects displayed as the list is selected, displaying the inspection data in a predetermined range with reference to the selected inspection object, the program being recorded in a recording medium.

With this configuration, inspection data in a predetermined range with reference to the inspection object having a defective inspection result is displayed. Therefore, it is possible to display inspection data of a product which is considered to require confirmation without resetting a search condition or the like.

Further, the program for the article inspection system of the present invention further includes a step of displaying a list of the inspection data of the inspection objects having the defective inspection result from the inspection record information, and a step of selecting the inspection object having the defective inspection result, as a reference, from the inspection objects displayed as the list.

With this configuration, a list of the inspection data of the inspection objects having a defective inspection result is displayed, and if one of the inspection objects displayed as the list is selected, inspection data in a predetermined range with reference to the selected inspection object is displayed. Therefore, it is possible to display inspection data of a product which is considered to require confirmation without resetting a search condition or the like.

Advantage of the Invention

According to the present invention, it is possible to provide an article inspection apparatus capable of displaying inspection data of a product which is considered to require confirmation without resetting a search condition or the like.

BRIEF DESCRIPTION OF THE DRAWINGS

FIG. 2 is a diagram showing an example of a search result list screen of the article inspection apparatus according to the embodiment of the present invention.

FIG. 3 is a diagram showing an example of a display screen of inspection data in a predetermined range with reference to a defective inspection object of the article inspection apparatus according to the embodiment of the present invention.

FIG. 8A shows an example in a case of an X-ray inspection apparatus, FIG. 8B shows an example in a case of a weight measurement apparatus, and FIG. 8C shows an example in a case of a metal detection apparatus.

BEST MODE FOR CARRYING OUT THE INVENTION

Hereinafter, an article inspection apparatus according to an embodiment of the present invention will be described in detail with reference to the drawings.

An article inspection apparatus 1 according to an embodiment of the present invention is incorporated in a product line (not shown) on which inspection objects W such as raw meat, fish, processed food, medicine or the like are conveyed, and inspects foreign matters, defects, or the like mixed in the inspection objects W, or whether or not the weights of the inspection objects W are within a specified range.

Figure 1:
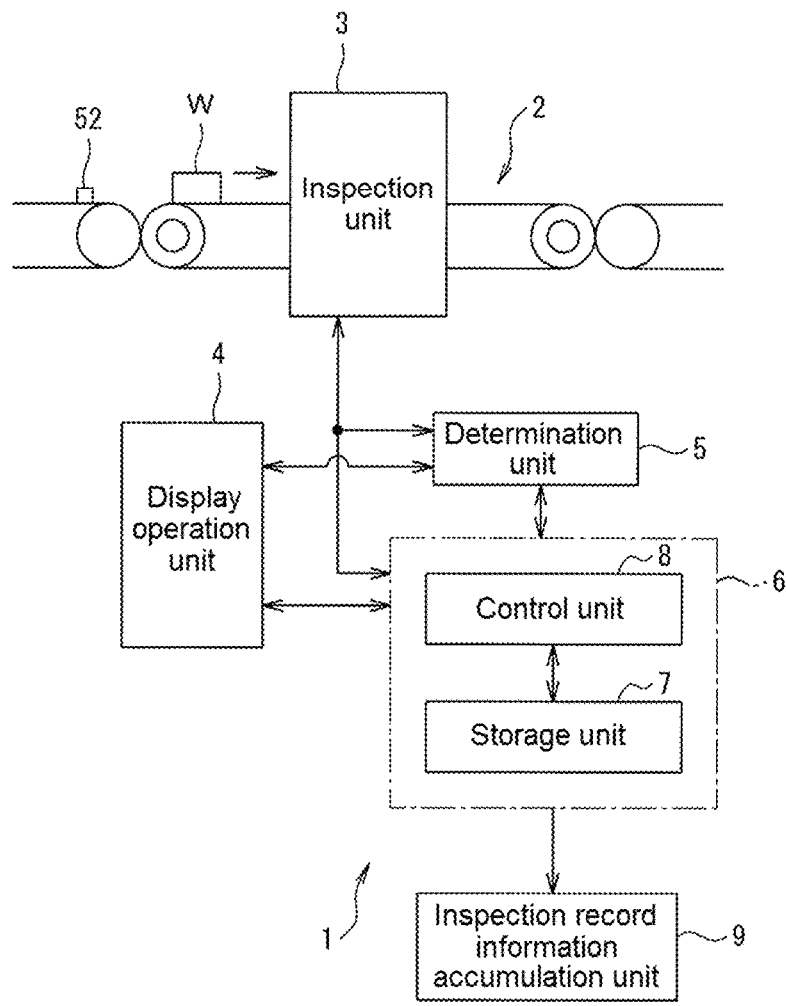
FIG. 1 is a schematic configuration diagram of an article inspection apparatus according to an embodiment of the present invention.

In FIG. 1, the article inspection apparatus 1 according to an embodiment of the present invention includes a conveyance unit 2, an inspection unit 3, a display operation unit 4, a determination unit 5, an integrated control unit 6, and an inspection record information accumulation unit 9.

The conveyance unit 2 sequentially conveys inspection objects W of a type, which is previously set in the display operation unit 4, from among various types such as raw meat, fish, processed food, medicine or the like, for example, and is a belt conveyor disposed horizontally to the apparatus body, for example.

Further, the conveyance unit 2 is driven by a driving motor (not shown), and conveys the loaded inspection object W in the arrow direction (rightward direction) in FIG. 1 at a predetermined conveyance speed.

The inspection unit 3 is configured to output a detection signal corresponding to the type and size of a foreign matter contained in the inspection object W or a detection signal corresponding to the weight of the inspection object W as a signal representing the quality state of the inspection object W. In a case where the article inspection apparatus 1 is a metal detection apparatus, the inspection unit 3 is configured to generate an alternating magnetic field of a predetermined frequency, and output a signal of which amplitude and phase change corresponding to the change of the magnetic field caused by the inspection object W passing through the alternating magnetic field. It may also be configured to magnetize the metal contained in the inspection object W with a magnetizer such as a magnet and to detect the residual magnetism of magnetized metal with the magnetic sensor.

In a case where the article inspection apparatus 1 is an X-ray inspection apparatus, the inspection unit 3 includes an X-ray generation source and an X-ray detector, and the X-ray detector is configured to detect X-rays transmitted through the inspection object W, when the X-ray is emitted from the X-ray generation source, and output a detection signal corresponding to the amount of transmission. As the X-ray detector, for example, an array-like line sensor including a plurality of photodiodes arranged in a line shape in a direction orthogonal to the conveyance direction of the inspection object W conveyed by the conveyance unit 2 and a scintillator provided on the photodiode is used. The X-ray detector is configured to receive X-rays transmitted through the inspection object W by a scintillator, convert the received X-rays into light, convert the light into an electric signal by a photodiode disposed below the X-ray detector, and output the electric signal. That is, an electric signal corresponding to the amount of X-ray transmission is output.

In a case where the article inspection apparatus 1 is a weight measurement apparatus, the inspection unit 3 is configured to use a part of the conveyance unit 2 is a weighting platform, weigh the load of the inspection object W placed on the weighing platform, by a load sensor including a balance mechanism such as an electromagnetic balance mechanism, which is disposed under the weighting platform, and outputs a signal corresponding to the load. The load sensor may be any scale mechanism capable of measuring the weight, and may be, for example, a scale mechanism such as a differential transformer mechanism or a strain gauge mechanism.

On the upstream side of the inspection unit 3, a load sensor 52 for detecting passage of the inspection object W conveyed by the conveyance unit 2 is provided. The load sensor 52 is a transmission-type photoelectric sensor including a pair of light projection units and light reception unit (not shown) which are disposed to face each other so as to straddle the conveyance unit 2 in the width direction (the front side and the back side in FIG. 1). When the inspection object W passes between the light projection unit and the light reception unit, the light reception unit is shielded by the inspection object W, so the load sensor 52 detects that the inspection object W passes through and loading of the inspection object W in the inspection unit 3 is started. The detection signal from the load sensor 52 is output to the control unit 8.

The display operation unit 4 is a touch panel that also serves as an input operation function and a display function, and is configured to receive, as input operations, a setting operation of the type of the inspection object W conveyed by the conveyance unit 2, and various setting operations and instruction operations related to foreign matter detection, weighing and operation confirmation with respect to the inspection object W.

As the display function, the display operation unit 4 is configured to perform various types of display such as a setting value when the setting operation of the type of the inspection object W is performed, an instruction value when the instruction operation is performed, various determination results, and the like.

The display operation unit 4 may have a configuration in which the input operation function and the display function are independent. In this case, a plurality of keys, switches, and the like for receiving input operations such as setting and instructions can be provided for the input operation function, and a liquid crystal display or the like can be provided for the display function.

The determination unit 5 is configured to perform a pass/fail determination as to whether or not a foreign matter is contained in the inspection object W, whether or not the weight of the inspection object W is within a specified range, or the like, based on the detection signal from the inspection unit 3, and display a screen including the determination result on the display operation unit 4.

The integrated control unit 6 controls the whole of the article inspection apparatus 1, and includes a storage unit 7 and a control unit 8.

The storage unit 7 is configured to store various programs for the control unit 8 to control the article inspection apparatus 1, various parameters for the determination unit 5 to perform a pass/fail determination on the inspection object W, and the like.

The control unit 8 executes the program stored in the storage unit 7 to change parameters of the determination unit 5, and perform various controls of the article inspection device 1, and the like.

The control unit 8 stores the determination result by the determination unit 5 for each inspection object W, a part of the detection signal from the inspection unit 3 as the basis of the determination result, and the date and time when the inspection is performed, in the inspection record information accumulation unit 9.

That is, in the article inspection apparatus 1, the detection signal from the inspection unit 3 is not discarded even after the determination by the determination unit 5, and is accumulated in the inspection record information accumulation unit 9. Further, the detection signal from the inspection unit 3 is made to correspond to each inspection object W according to the date and time when the inspection is performed by the inspection unit 3 (or the determination by the determination unit 5).

In this manner, the inspection record information accumulation unit 9 is configured to record all data of so-called inspection results.

The control unit 8 searches for the inspection data stored in the inspection record information accumulation unit by condition setting by the operation on the display operation unit 4 and displays the searched inspection data on the display operation unit 4.

For example, when the "today's NG list" of the article inspection apparatus 1 as the X-ray inspection apparatus is input as an extraction condition by the operation on the display operation unit 4, as shown in FIG. 2, the control unit 8 displays a list of the inspection objects W determined to be defective items in the inspection performed by the article inspection apparatus 1 as the X-ray inspection apparatus on the day, on the display operation unit 4.

In FIG. 2, for example, when the line indicated by A is selected by the operation of the display operation unit 4, the control unit 8 displays the X-ray transmission image of the inspection object W corresponding to the selected line on the image display unit 101.

In FIG. 2, for example, when a front/rear information display button 102 is selected by the operation of the display operation unit 4 in a state where the line indicated by A is selected by the operation of the display operation unit 4, the control unit 8 displays a list of the inspection objects W produced and inspected before and after the inspection object W of the line indicated by A on the display operation unit 4 as shown in FIG. 3.

In FIG. 3, for example, when lines before and after the line indicated by A are selected by the operation on the display operation unit 4, the control unit 8 displays X-ray transmission images of the inspection objects W corresponding to the selected lines on the image display unit 101.

In this manner, a list of the inspection objects W produced and inspected before and after the inspection object W which is determined to be NG in the inspection is displayed, and the inspection data can be selected and referred to by the operation of the display operation unit 4.

For example, when a blade or the like is missing and mixed in a product, large fragments are detected to make the result NG, but small fragments are not detected to make the result OK, in some cases. In such a case, there is a high possibility that small fragments are mixed in the inspection objects W before and after the inspection object W for which large fragments are detected and is determined to be NG.

According to the present embodiment, by the operation of the front/rear information display button 102, a list of the inspection objects W before and after the inspection object W which is determined to be NG is displayed and the inspection data can be referred to, so it is possible to display the inspection information of products which are inspected at the same time with the defective inspection object W and are considered to require confirmation, without resetting a search condition.

In FIG. 3, when the search result return button 103 is selected by the operation of the display operation unit 4, the control unit 8 displays a search result screen as shown in FIG. 2, on the display operation unit 4.

Figure 4:
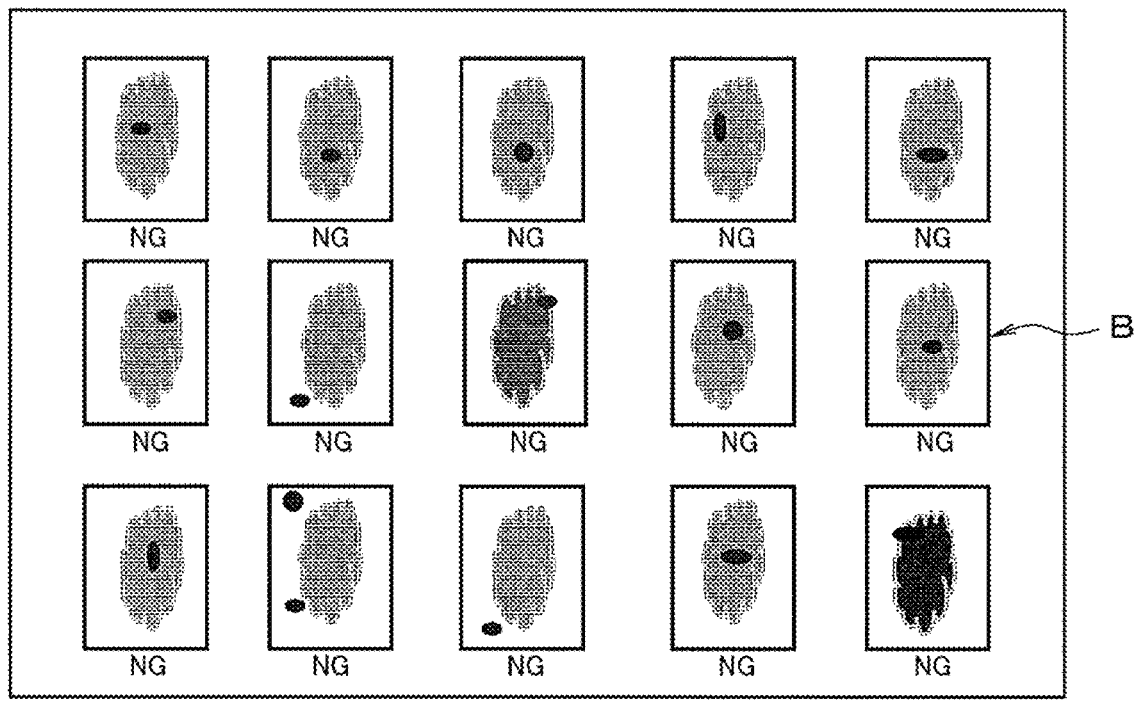
FIG. 4 is a diagram showing a display example of an image of the search result list screen of the article inspection apparatus according to the embodiment of the present invention.

In addition, as shown in FIG. 4, a list of X-ray transmission images of the inspection object W may be displayed as the display screen of the search result. FIG. 4 shows a case where a list of the inspection objects W determined to be defective items is displayed.

Figure 5:
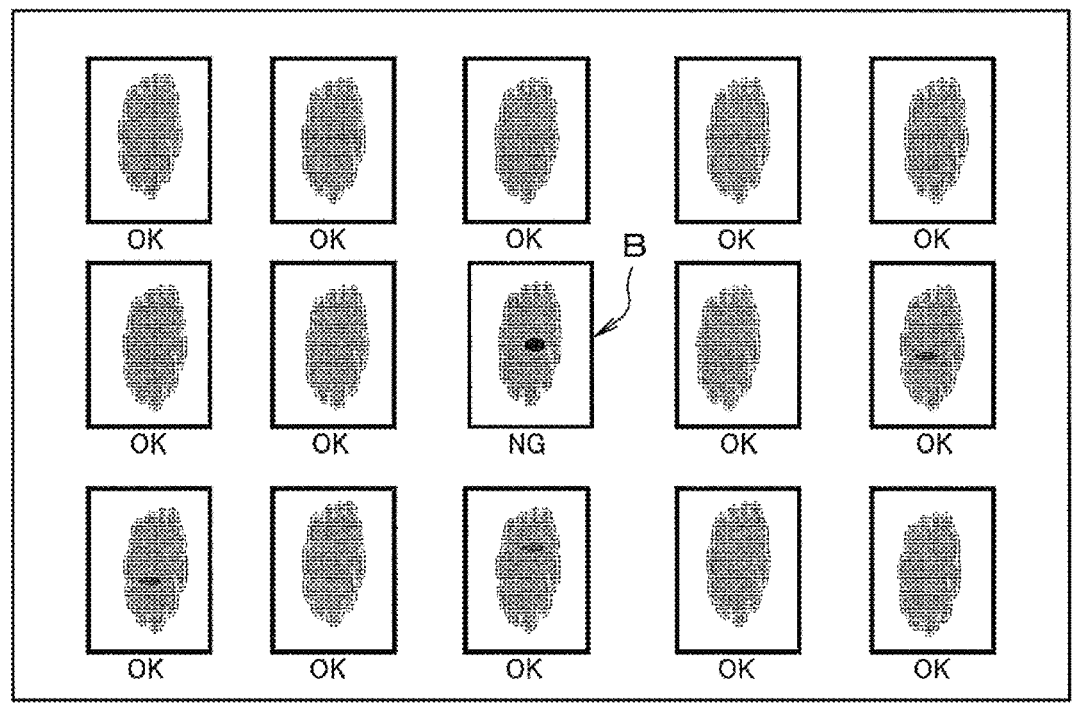
FIG. 5 is a diagram showing a first display example of an image of a display screen of inspection data in a predetermined range with reference to a defective inspection object of the article inspection apparatus according to the embodiment of the present invention.

In FIG. 4, when the image indicated by B is selected by the operation of the display operation unit 4, the control unit 8 displays a list of the inspection objects W produced and inspected before and after the inspection object W of the image indicated by B on the display operation unit 4 as shown in FIG. 5. In FIG. 5, the X-ray transmission images of respective seven inspection objects W before and after the inspection object W of the image indicated by B are displayed.

Figure 6:
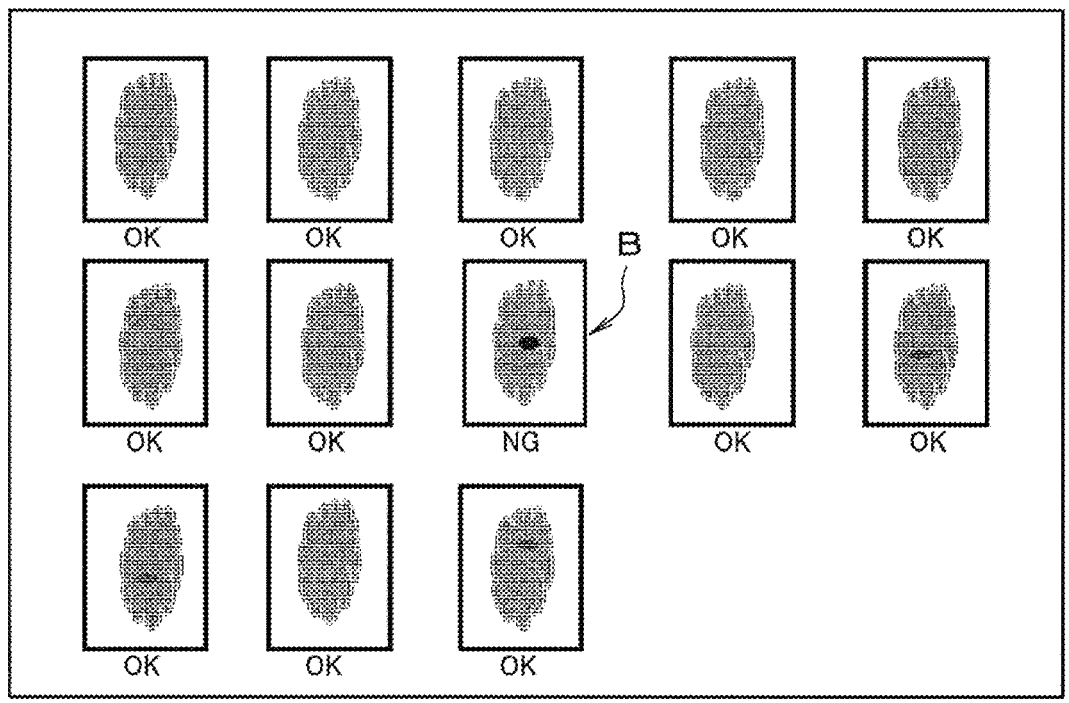
FIG. 6 is a diagram showing a second display example of an image of a display screen of inspection data in a predetermined range with reference to a defective inspection object of the article inspection apparatus according to the embodiment of the present invention.
Figure 7:
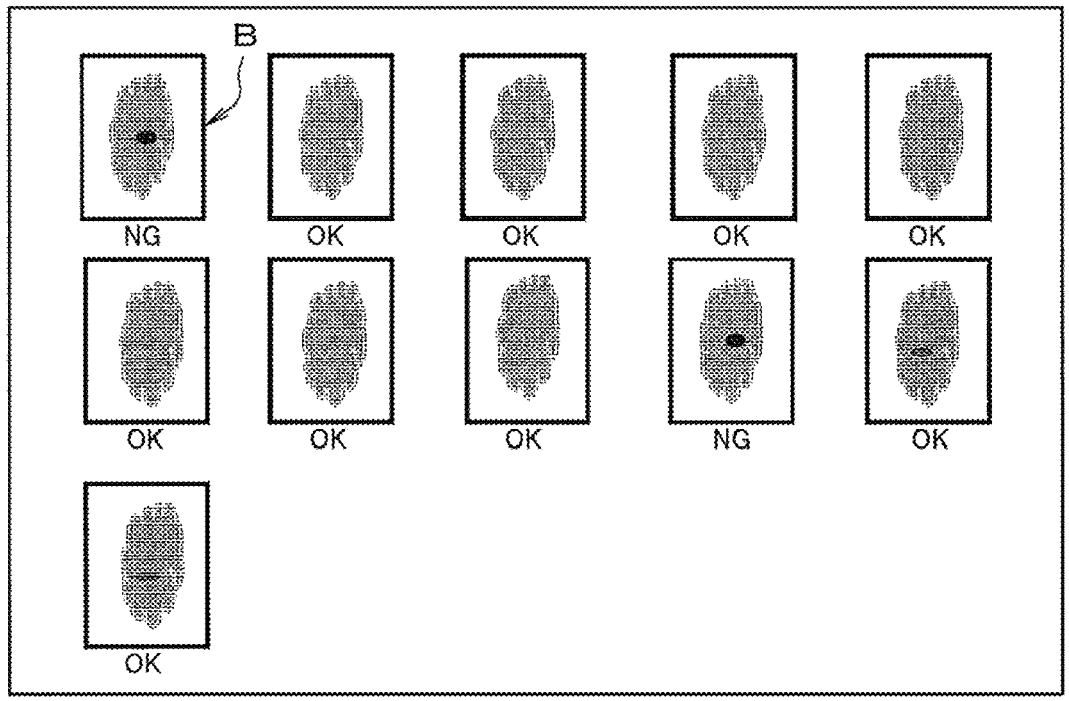
FIG. 7 is a diagram showing a third display example of an image of a display screen of inspection data in a predetermined range with reference to a defective inspection object of the article inspection apparatus according to the embodiment of the present invention.

The X-ray inspection images of the same number of precedent and subsequent inspection objects W may not be displayed respectively. Alternatively, seven objects before and five objects after may be displayed as shown in FIG. 6, or ten objects after may be displayed as shown in FIG. 7.

Figure 8A:
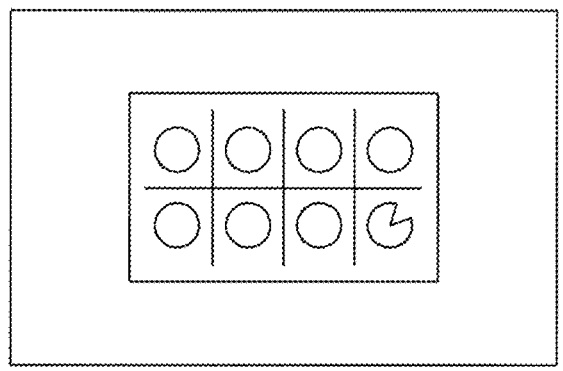
FIGS. 8A to 8C are diagrams showing an example of an image displayed on an image display unit of the article inspection apparatus according to the embodiment of the present invention.

In a case where the article inspection apparatus 1 is an X-ray inspection apparatus, with respect to the images displayed on the image display unit 101 and the images at the time of displaying a list of the images of FIG. 4 to FIG. 7, the X-ray transmission image as shown in FIG. 8A is displayed.

Figure 8B:
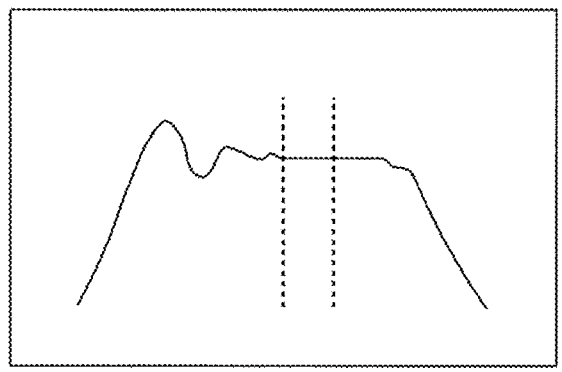
Figure 8C:
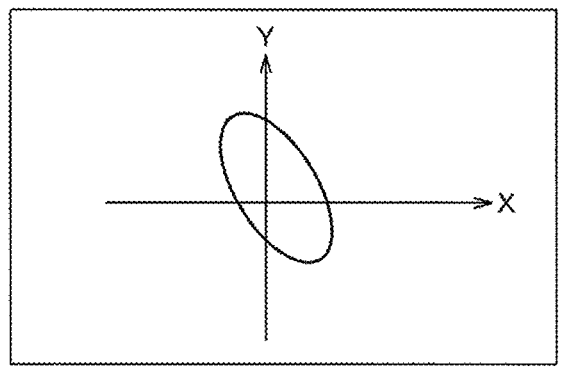

In a case where the article inspection apparatus 1 is a metal detection apparatus, a Lissajous waveform generated from changes in amplitude and phase of a signal output from the inspection unit 3 with time as shown in FIG. 8C is displayed.

In a case where the article inspection apparatus 1 is a weight measurement apparatus, an image representing a change in weight with time as a waveform as shown in FIG. 8B is displayed. The inspection object W is weighed at a timing when the weight signal by the inspection unit 3 is stabilized (timing sandwiched by two broken lines in FIG. 8B).

Further, a list of the inspection objects W before and after the inspection object W selected from the list of the inspection objects W determined to be defective items is displayed. However, when "today's NG list" is selected as the extraction condition, a list of the inspection objects W before and after the latest inspection object W determined to be a defective item may be displayed.

Further, it may also be configured to be able to read the inspection data stored in the inspection record information accumulation unit 9 from a server apparatus or the like through a communication medium such as a network, and the same display may be performed by the server apparatus or the like.

Thus, various processes can be performed at a higher speed as compared with the case where the control unit 8 performs the search and data processing.

Further, inspection data may be transmitted to a server apparatus or the like through a communication medium such as a network, the server apparatus or the like may accumulate inspection data, and a similar display may be performed by executing the program stored in the server apparatus or the like.

This makes it possible to store a large amount of inspection data as compared with the case of storing inspection data in the inspection record information accumulation unit 9. Further, various processes can be performed at a higher speed as compared with the case where the control unit 8 performs the search and data processing.

Further, inspection data of a plurality of article inspection apparatuses may be transmitted to one server apparatus and managed by the server apparatus.

Thereby, the inspection data of the plurality of article inspection apparatuses can be referred to by one server apparatus, and inspection data can be efficiently confirmed.

Although embodiments of the present invention have been disclosed, it will be apparent to those skilled in the art that modifications may be made without departing from the scope of the invention. All such modifications and equivalents are intended to be included in the following claims.

DESCRIPTION OF REFERENCE NUMERALS AND SIGNS 1 article inspection apparatus
4 display operation unit
8 control unit 9 inspection record information accumulation unit

What is claimed is:

1. An article inspection apparatus which includes an inspection record information accumulation unit that accumulates inspection record information including inspection date and time and inspection data of a conveyed inspection object which is inspected, and displays the inspection record information on a display unit, the article inspection apparatus comprising:
a control unit that displays on the display unit:
the inspection data, as images representing a detection signal, in a predetermined range with reference to the inspection object having a defective inspection result from the inspection record information, and
the corresponding defective inspection result adjacent to each image representing the detection signal.

2. The article inspection apparatus according to claim 1, wherein the control unit displays on the display unit, a list of the inspection data of inspection objects having the defective inspection result from the inspection record information, and displays on the display unit, the inspection data in a predetermined range with reference to the inspection object having the defective inspection result, selected from the inspection objects displayed as the list by an operation on an operation unit.

3. The article inspection apparatus according to claim 2, wherein the control unit displays on the display unit, one image representing the detection signal obtained by inspection as the inspection data selected by the operation of the display operation unit from the list of the inspection data of the inspection objects having the defective inspection result from the inspection record information.

4. The article inspection apparatus according to claim 1, wherein the control unit displays on the display unit, the inspection data in a predetermined range with reference to a latest inspection object having the defective inspection result.

5. The article inspection apparatus according to claim 1, wherein the images representing the detection signal are X-ray transmission images.

6. The article inspection apparatus according to claim 1, wherein the images representing the detection signal are Lissajous waveforms.

7. The article inspection apparatus according to claim 1, wherein the images representing the detection signal are images showing a change in a weight with respect to time.

8. An article inspection system which manages inspection record information including inspection date and time and inspection data of an article inspection apparatus for inspecting a conveyed inspection object, the article inspection system comprising:
a server apparatus that displays:
the inspection data, as images representing a detection signal, in a predetermined range with reference to the inspection object having a defective inspection result from the inspection record information, and
the corresponding defective inspection result adjacent to each image representing the detection signal.

9. The article inspection system according to claim 8, wherein the server apparatus displays a list of the inspection data of inspection objects having the defective inspection result from the inspection record information, and displays the inspection data in a predetermined range with reference to the inspection object having the defective inspection result, selected from the inspection objects displayed as the list.

10. A non-transitory computer-readable storage medium storing a computer program for an article inspection system which manages inspection record information including inspection date and time and inspection data of an article inspection apparatus for inspecting a conveyed inspection object, the program causing a computer to execute:
a step of displaying:
the inspection data, as images representing a detection signal, in a predetermined range with reference to inspection objects having a defective inspection result from the inspection record information, and
the corresponding defective inspection result adjacent to each image representing the detection signal.

11. The non-transitory computer-readable storage medium storing a computer program according to claim 10, the program causing a computer to further execute:
a step of displaying a list of the inspection data of the inspection objects having the defective inspection result from the inspection record information; and
a step of selecting the inspection object having the defective inspection result, as a reference, from the inspection objects displayed as the list.

* * * * *